US007237918B2

United States Patent
Fukai et al.

(10) Patent No.: US 7,237,918 B2
(45) Date of Patent: Jul. 3, 2007

(54) VEHICLE MIRROR ACTUATOR AND EXTERIOR MIRROR FOR VEHICLE

(75) Inventors: Akira Fukai, Fujieda (JP); Fuminori Endoh, Fujieda (JP)

(73) Assignee: Murakami Corporation, Shizuoka-shi (JP)

( * ) Notice: Subject to any disclaimer, the term of this patent is extended or adjusted under 35 U.S.C. 154(b) by 79 days.

(21) Appl. No.: 11/069,549

(22) Filed: Mar. 2, 2005

(65) Prior Publication Data

US 2005/0231837 A1    Oct. 20, 2005

(30) Foreign Application Priority Data

Mar. 2, 2004    (JP)    ............... 2004-057180

(51) Int. Cl.
*G02B 5/08*    (2006.01)
(52) U.S. Cl. .................................... 359/874
(58) Field of Classification Search ........ 359/872–874, 359/876, 877
See application file for complete search history.

(56) References Cited

U.S. PATENT DOCUMENTS

| | | | | |
|---|---|---|---|---|
| 4,247,172 A | * | 1/1981 | Wunsch et al. | ............. 359/876 |
| 4,598,605 A | | 7/1986 | Manzoni | |
| 4,971,430 A | * | 11/1990 | Lynas | ........................ 359/843 |

FOREIGN PATENT DOCUMENTS

| EP | 1 020 328 A2 | 7/2000 |
|---|---|---|
| JP | 56-108329 | 8/1981 |
| JP | 2002-67795 | 3/2002 |

* cited by examiner

*Primary Examiner*—Mark A. Robinson
*Assistant Examiner*—Mark Consilvio
(74) *Attorney, Agent, or Firm*—Oblon, Spivak, McClelland, Maier & Neustadt, P.C.

(57) ABSTRACT

A vehicle mirror actuator includes an actuator housing, a first motor, and a second motor. The second motor is provided in the actuator housing and configured to adjust a mirror angle in a second direction of a mirror. The first motor is provided in the actuator housing between the second motor and the mirror and configured to adjust a mirror angle in a first direction of the mirror.

8 Claims, 8 Drawing Sheets

VEHICLE MIRROR ACTUATOR AND EXTERIOR MIRROR FOR VEHICLE

CROSS-REFERENCE TO RELATED APPLICATIONS

The present application claims priority under 35 U.S.C. §119 to Japanese Patent Application No. 2004-57180, filed Mar. 2, 2004, entitled "Actuator for Outside Mirror." The contents of that application are incorporated herein by reference in their entirety.

BACKGROUND OF THE INVENTION

1. Field of the Invention

The present invention relates to a vehicle mirror actuator and an exterior mirror for a vehicle.

2. Discussion of the Background

Figure 4:
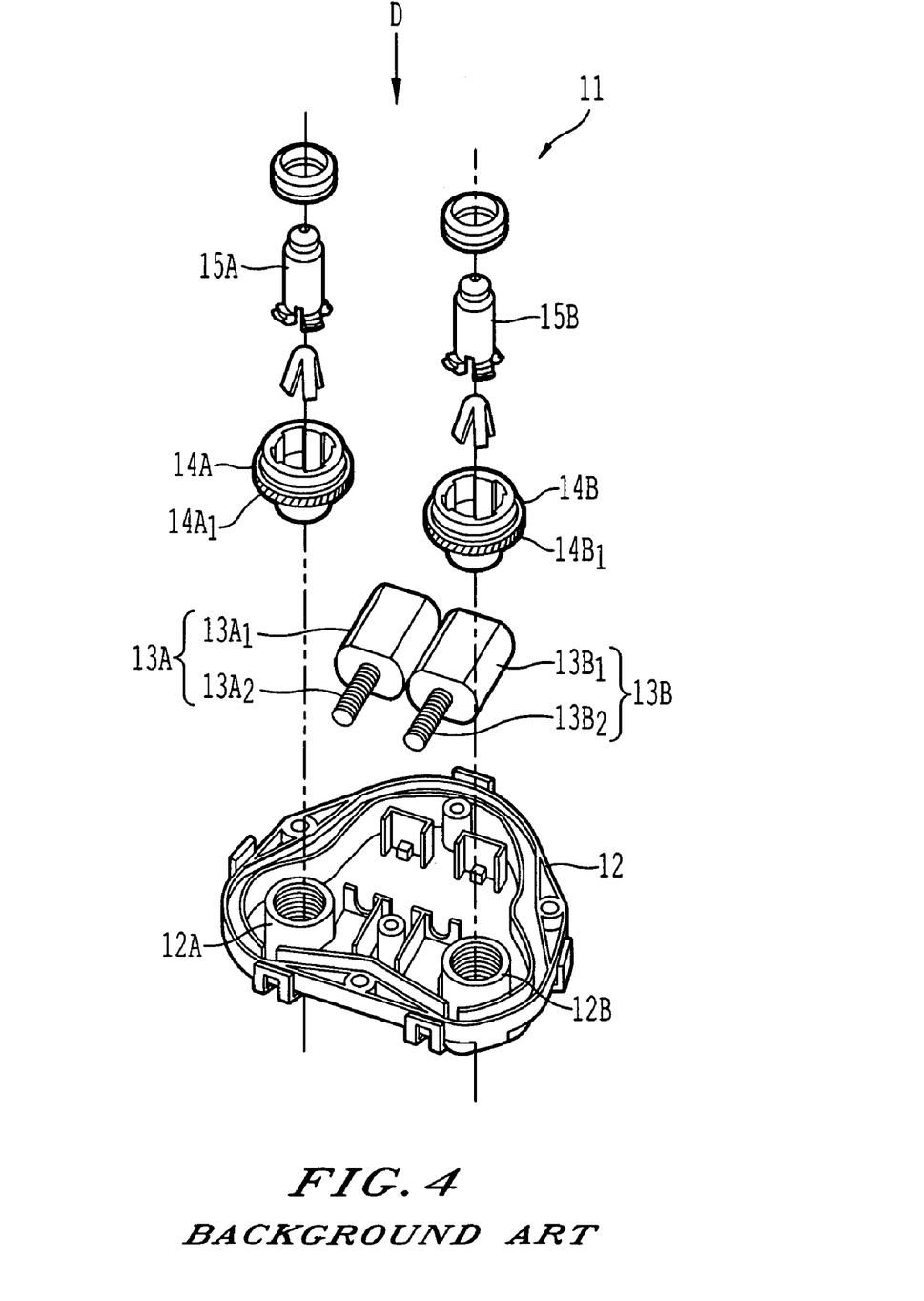
FIG. 4 is an exploded perspective view of a vehicle mirror actuator for an exterior rear view mirror disclosed in Japanese Laid-Open Patent Application Publication No. 2002-67795.

Japanese Laid-Open Patent Application Publication No. 2002-67795 discloses a vehicle mirror actuator which adjusts a mirror angle of a vehicle mirror. The contents of this application are incorporated herein by reference in their entirety. FIG. 4 shows an exploded perspective view of Japanese Laid-Open Patent Application Publication No. 2002-67795.

Referring to FIG. 4, a vehicle mirror actuator 11 has a first motor unit 13A, a first wheel-cylinder assembly 14A and a first rod 15A in an actuator housing 12 in order to adjust a mirror angle in a first direction. The actuator 11 also has a second motor unit 13B, a second wheel-cylinder assembly 14B and a second rod 15B in the actuator housing 12 in order to adjust a mirror angle in a second direction. The first motor unit 13A and the second motor unit 13B include a first motor $13A_1$ and a second motor $13B_1$, respectively, and a first worm wheel $13A_2$ and a second worm wheel $13B_2$, respectively. The first motor $13A_1$ and the second motor $13B_1$ rotate the first worm wheel $13A_2$ and the second worm wheel $13B_2$, respectively. The first wheel-cylinder assembly 14A and the second wheel-cylinder assembly 14B include a first gear $14A_1$ and a second gear $14B_1$, respectively. The first gear $14A_1$ and the second gear $14B_1$ engage with the first worm wheel $13A_2$ and the second worm wheel $13B_2$, respectively. The first rod 15A and the second rod 15B are provided with the first wheel-cylinder assembly 14A and the second wheel-cylinder assembly 14B, respectively. The first rod 15A and the second rod 15B are arranged not to rotate against the first wheel-cylinder assembly 14A and the second wheel-cylinder assembly 14B, respectively, and arranged to extend and retract as the first wheel-cylinder assembly 14A and the second wheel-cylinder assembly 14B are rotated by the first worm wheel $13A_2$ and the second worm wheel $13B_2$, respectively.

SUMMARY OF THE INVENTION

According to one aspect of the present invention, a vehicle mirror actuator includes an actuator housing, a first motor, and a second motor. The second motor is provided in the actuator housing and configured to adjust a mirror angle in a second direction of a mirror. The first motor is provided in the actuator housing between the second motor and the mirror and configured to adjust a mirror angle in a first direction of the mirror.

According to another aspect of the present invention, an exterior mirror for a vehicle includes a mirror, an actuator housing, a first motor, and a second motor. The second motor is provided in the actuator housing and configured to adjust a mirror angle in a second direction of the mirror. The first motor is provided in the actuator housing between the second motor and the mirror and configured to adjust a mirror angle in a first direction of the mirror.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Descriptive words with respect to directions, for example, upward, downward, rightward, leftward, forward and backward, are defined relatively to a perspective of a driver of a vehicle to which the embodiments of the present invention is provided.

Figure 1:
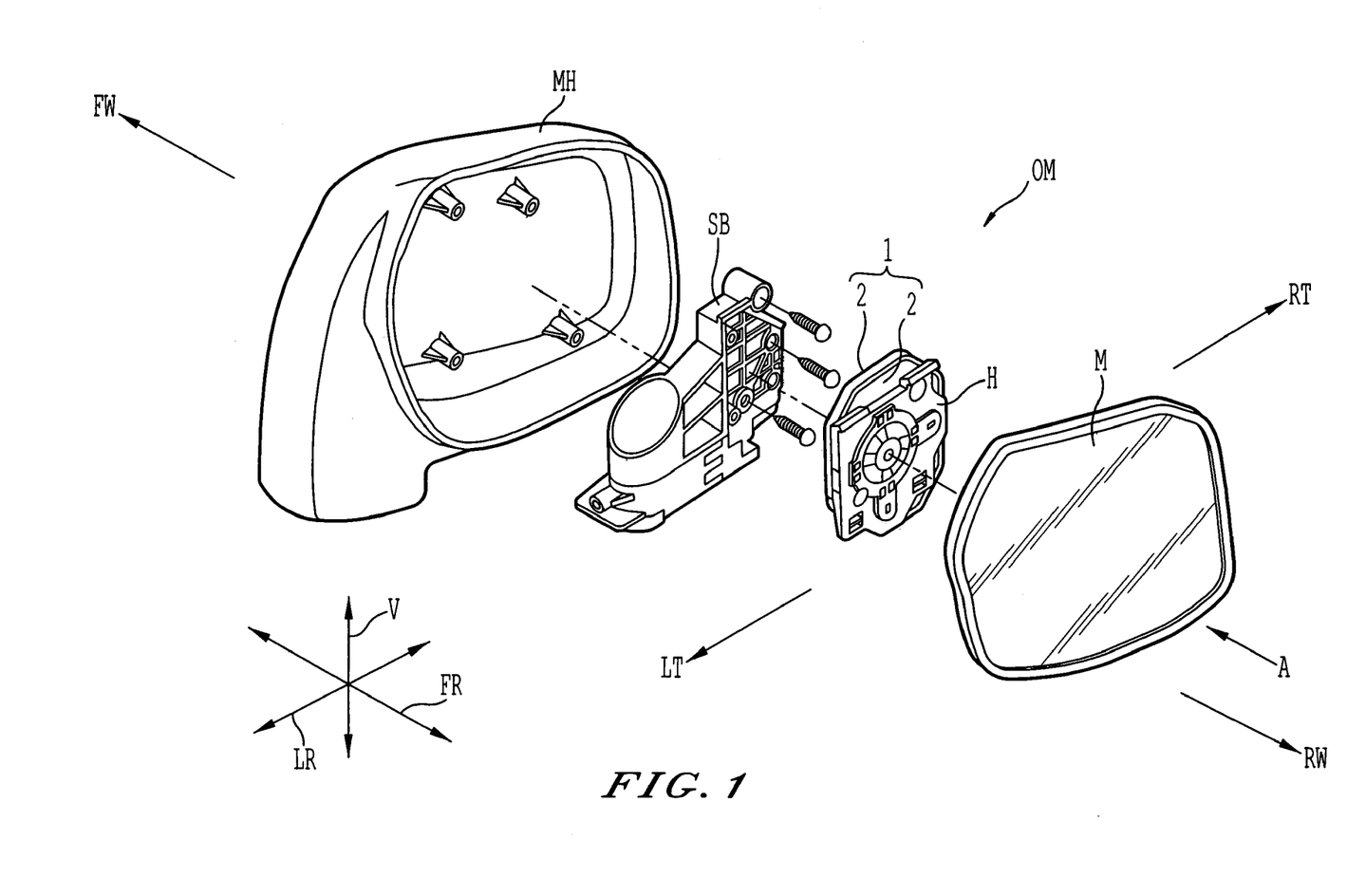
FIG. 1 is an exploded perspective view showing a right side exterior rear view mirror for a vehicle according to an embodiment of the present invention.

FIG. 1 is an exploded perspective view showing a main portion of a right side exterior rear view mirror OM according to an embodiment of the present invention. Referring to FIG. 1, the right side exterior rear view mirror OM includes a mirror housing MH, a flame 5B, a vehicle mirror actuator 1, a mirror holder H and a mirror M. The mirror housing MH is pivotably provided on a side body of a vehicle via the flame 5B. The mirror M is fixed to the mirror holder H. The vehicle mirror actuator 1 is fixed on a surface of the frame 5B. The vehicle mirror actuator 1 supports the mirror holder H using a supporting structure, for example, disclosed in Japanese Patent Laid-Open No. 2002-67795.

Figure 2A:
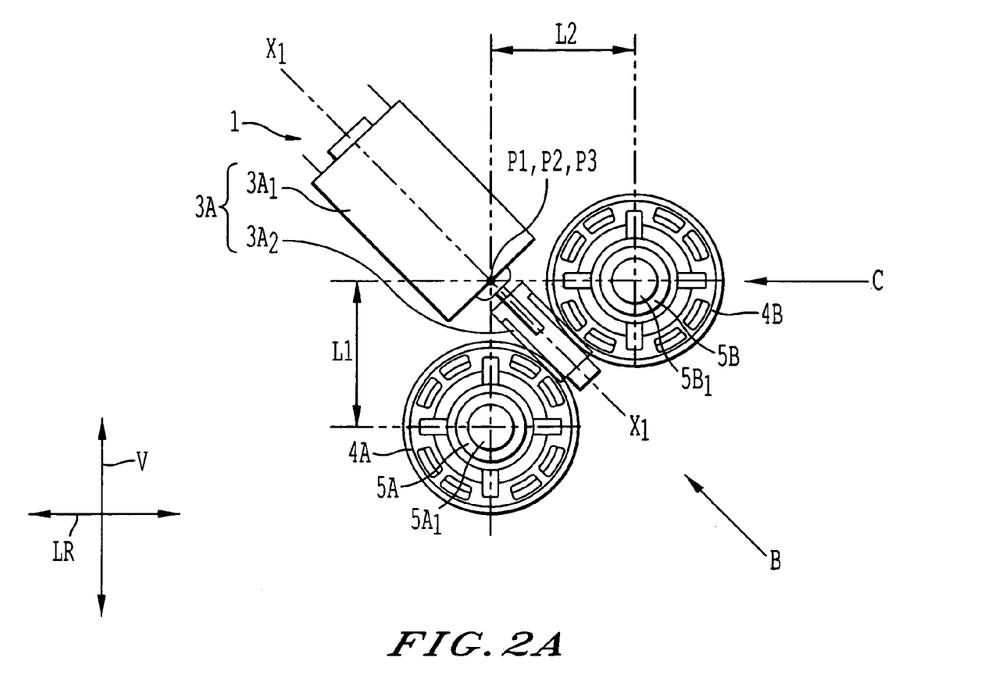
FIG. 2A is a plan view of a vehicle mirror actuator contained in the right side exterior rear view mirror shown in FIG. 1.
Figure 2B:
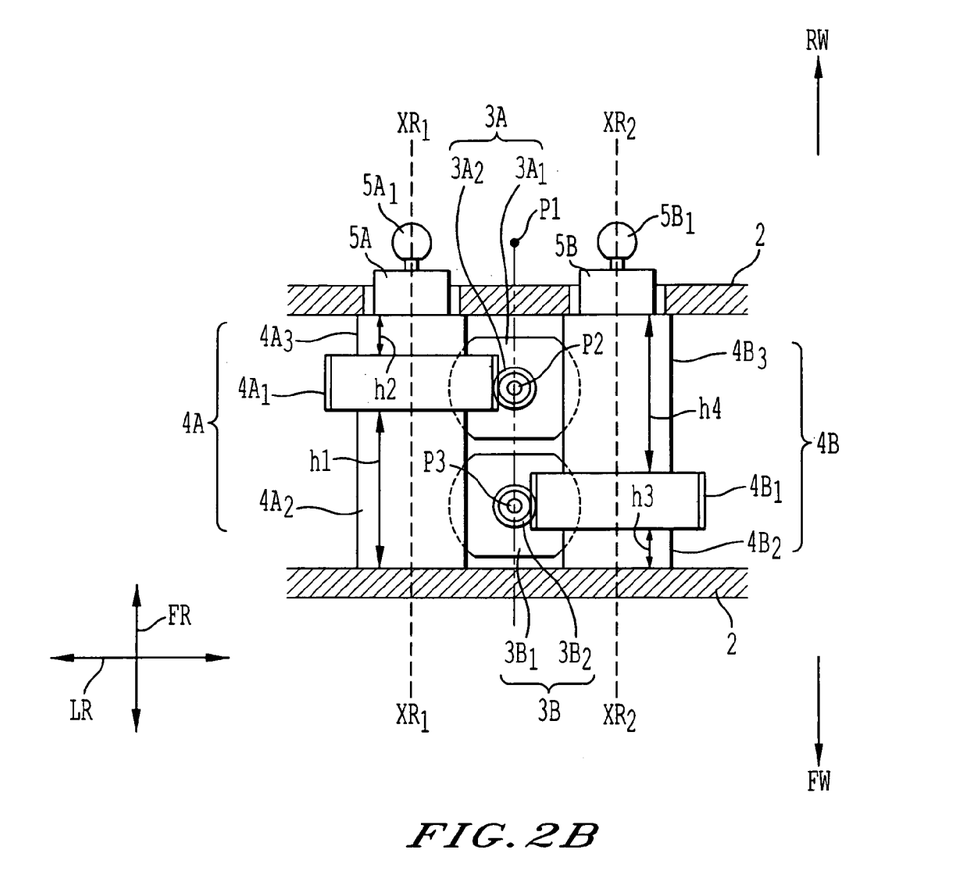
FIG. 2B is a side view of the vehicle mirror actuator shown in FIG. 2A.
Figure 2C:
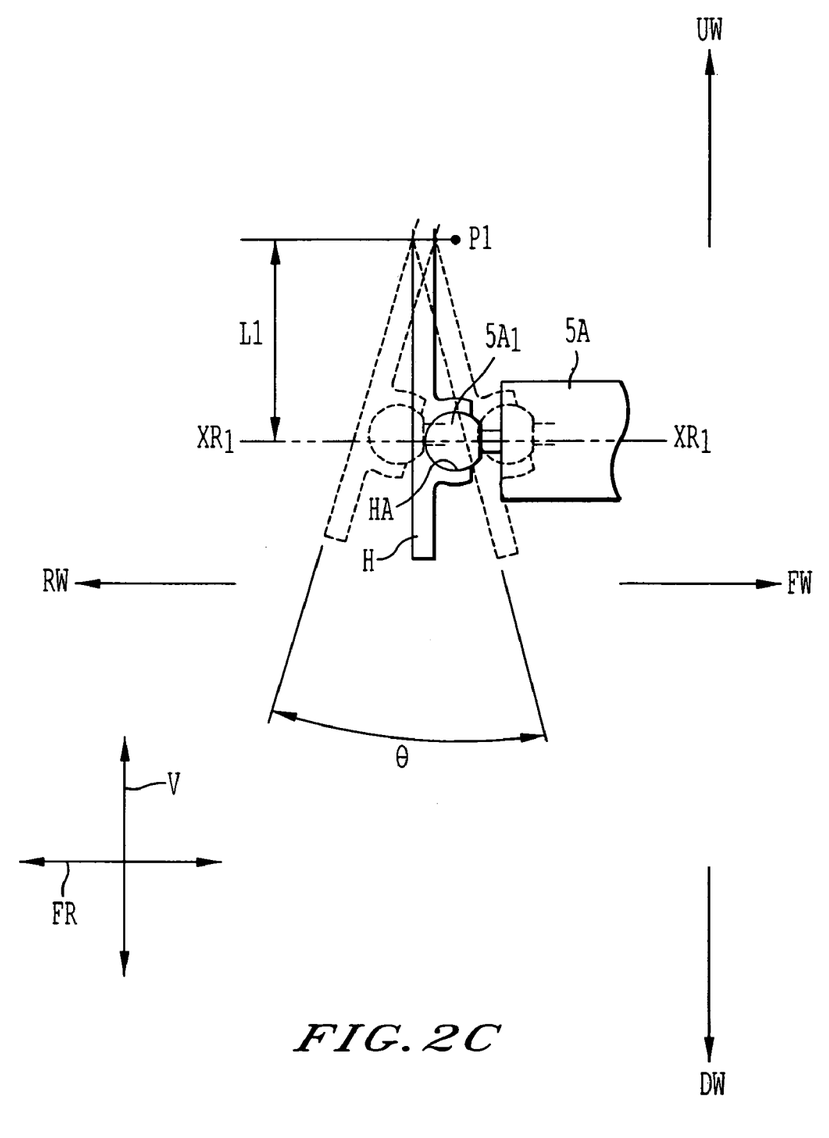
FIG. 2C is a side view of a mirror holder and a rod according to the embodiment of the present invention, explaining an adjust span.

FIGS. 2A–2C show the vehicle mirror actuator 1 in schematic views. The vehicle mirror actuator 1 has an actuator housing 2 which includes a first mirror angle adjusting mechanism and a second mirror angle adjusting mechanism. The first mirror angle adjusting mechanism changes a mirror angle in a first direction by rotating the mirror M around a rotation center P1 of the mirror M. The first direction according to the embodiment of the present invention is, for example, in a forward-rearward direction FR. The second mirror angle adjusting mechanism changes a mirror angle in a second direction by rotating the mirror M around the rotation center P1 of the mirror M. The second direction according to the embodiment of the present invention is, for example, in a leftward-rightward direction LR. Preferably, the first direction is substantially perpendicular to the second direction.

FIG. 2A is a view of the vehicle mirror actuator 1 in a direction of A in FIG. 1. FIG. 2B is a view of the vehicle mirror actuator 1 in a direction of B in FIG. 2A Referring to FIGS. 2A and 2B, the first mirror angle adjusting mechanism includes a first motor unit 3A, a first wheel-cylinder assembly 4A and a first rod 5A. The first motor unit 3A has a first motor $3A_1$ and a first worm wheel $3A_2$. The first motor $3A_1$ is driven by electrical power from an outer power source, and rotates the first worm wheel $3A_2$. The first motor unit 3A is positioned so that a first rotational axis $X_1$ of the first motor $3A_1$ is angled, for example, toward lower-right at 45 degrees against a vertical direction V when viewed facing toward a forward direction FW in FIG. 1.

The first wheel-cylinder assembly 4A is positioned, for example, at lower-left of the first worm wheel $3A_2$, when viewed facing toward the forward direction FW, such that a first rotational axis $XR_1$ of the first wheel-cylinder assembly 4A is arranged in the forward-rearward direction FR. Referring to FIGS. 2A and 2B, the first wheel-cylinder assembly 4A includes a first gear $4A_1$, a first front cylinder $4A_2$ and a first rear cylinder $4A_3$. The first gear $4A_1$ is fixed between the first front cylinder $4A_2$ and the first rear cylinder $4A_3$ such that the first gear $4A_1$ is engaged with the first worm wheel $3A_2$, and rotated by the rotation of the first worm wheel $3A_2$. Consequently, a length $h_1$ of the first front cylinder $4A_2$ along the first rotational axis $XR_1$ is longer than a length $h_2$ of the first rear cylinder $4A_3$ along the first rotational axis $XR_1$.

The first rod 5A is provided with the first wheel-cylinder assembly 4A such that the first rod 5A protrudes out from the first rear cylinder $4A_3$, and connects by a first pivot $5A_1$ with the mirror holder H through an opening of the actuator housing 2. The first rod 5A is arranged so that the first rod 5A does not rotate around the first rotational axis $XR_1$ of the first wheel-cylinder assembly 4A, and extends and retracts in the forward-rearward direction FR as the first wheel-cylinder assembly 4A is rotated by the first worm wheel $3A_2$. Accordingly, an extension and retraction of the first rod 5A adjust the first direction of the mirror angle, which is, for example, the forward-rearward direction FR.

The first rod 5A is arranged not to rotate, for example, by being provided with a projection on a surface of an outer circumference of the first rod 5A. The projection latches with a corresponding concave portion which is provided on a surface of an inner circumference of the first wheel-cylinder assembly 4A. The first rod 5A is arranged to extend and retract, for example, by being provided with a screw with the first wheel-cylinder assembly 4A. The first rod 5A is provided with a hollow extending along the first rotational axis $XR_1$ of the first wheel-cylinder assembly 4A. The hollow is provided with a groove on a surface of an inner circumference of the hollow. The screw is provided inside of the first wheel-cylinder assembly 4A along the first rotational axis $XR_1$, protruding into an inside of the hollow of the first rod 5A. The groove of the hollow of the first rod 5A engages with the screw of the first wheel-cylinder assembly 4A so that the first rod 5A extends and retracts in the forward-rearward direction FR as the first wheel-cylinder assembly 4A rotates.

FIG. 2C is a view, in a direction of C in FIG. 2A, of an assembly of the first pivot 5A which is provided with an end face of the first rod 5A and a concave portion HA which is provided with the mirror holder H. Referring to FIG. 2C, the first pivot $5A_1$ of the first rod 5A is inserted to the concave portion HA of the mirror holder H, and arranged to be rotatable in the concave portion HA. The first pivot $5A_1$ is positioned, for example, below the rotation center P1 of the mirror M, for example, along the vertical direction V. The first pivot $5A_1$ pushes the mirror holder H at the concave portion HA in a rearward direction RW when the first rod 5A extends out from the first wheel-cylinder assembly 4A as the first wheel-cylinder assembly 4A is rotated by the first worm wheel $3A_2$. The first pivot $5A_1$ pulls the mirror holder H at the concave portion HA in the forward direction FW when the first rod 5A retracts into the first wheel-cylinder assembly 4A as the first wheel-cylinder assembly 4A is rotated by the first worm wheel $3A_2$.

Referring back to FIG. 2B, the second mirror angle adjusting mechanism of the vehicle mirror actuator 1 includes a second motor unit 3B, a second wheel-cylinder assembly 4B and a second rod 5B. The second motor unit 3B has a substantially same configuration with the first motor unit 3A, and has a second motor $3B_1$ and a second worm wheel $3B_2$. The second motor $3B_1$ is driven by electrical power from an outer power source, and rotates the second worm wheel $3B_2$. The first motor unit 3A and the second motor unit 3B is arranged such that the first motor $3A_1$ is provided between the second motor $3B_1$ and the mirror M. A second rotational axis $X_2$ of the second motor $3B_1$ is parallel to the first rotational axis $X_1$ of the first motor $3A_1$ and angled in a substantially same direction as the first rotational axis $X_1$, which is, for example, toward lower-right at 45 degrees against the vertical direction V when viewed facing toward the forward direction FW. The first motor $3A_1$ and the second motor $3B_1$ are arranged to overlap each other substantially entirely along an arranging direction of the first motor $3A_1$, the second motor $3B_1$ and the mirror M. The arranging direction is, for example, in the forward-rearward direction FR. Further, a point P2 on the first rotational axis $X_1$ of the first motor $3A_1$, a point P3 on the second rotational axis $X_2$ of the second motor $3B_1$, and the rotation center P1 of the mirror M are aligned on a single straight line.

The second wheel-cylinder assembly 4B is positioned, for example, at upper-right of the second worm wheel $3B_2$, when viewed facing toward the forward direction FW, such that a second rotational axis $XR_2$ of the second wheel-cylinder assembly 4B is arranged in the forward-rearward direction FR. The second wheel-cylinder assembly 4B includes a second gear $4B_1$, a second front cylinder $4B_2$ and a second rear cylinder $4B_3$. The second gear $4B_1$ is fixed between the second front cylinder $4B_2$ and the second rear cylinder $4B_3$ such that the second gear $4B_1$ is engaged with the second worm wheel $3B_2$, and rotated by the rotation of the second worm wheel $3B_2$. Consequently, a length $h_3$ of the second front cylinder $4B_2$ along the second rotational axis $XR_2$ is shorter than a length $h_4$ of the second rear cylinder $4B_3$ along the second rotational axis $XR_2$.

The second rod 5B is provided with the second wheel-cylinder assembly 4B such that the second rod 5B protrudes out from the second rear cylinder $4B_3$, and connects by a second pivot $5B_1$ with the mirror holder H through an opening of the actuator housing 2. The second rod 5B is arranged so that the second rod 5B does not rotate around the second rotational axis $XR_2$ of the second wheel-cylinder assembly 4B, and extends and retracts in the forward-rearward direction FR as the second wheel-cylinder assembly 4B is rotated by the second worm wheel $3B_2$. Accordingly, an extension and retraction of the second rod 5B adjust the second direction of the mirror angle, which is, for example, the leftward-rightward direction LR.

The second rod 5B is arranged, in a similar manner to the first rod 5A, not to rotate, for example, by being provided with a projection on a surface of an outer circumference of the second rod 5B. The projection latches with a corresponding concave portion which is provided on a surface of an inner circumference of the second wheel-cylinder assembly 4B. The second rod 5B is arranged to extend and retract, for example, by being provided with a screw with the second wheel-cylinder assembly 4B. The second rod 5B is provided with a hollow extending along the second rotational axis $XR_2$ of the second wheel-cylinder assembly 4B. The hollow is provided with a groove on a surface of an inner circumference of the hollow. The screw is provided inside of the second wheel-cylinder assembly 4B along the second rotational axis $XR_2$, protruding into an inside of the hollow of the second rod 5B. The groove of the hollow of the second rod 5B engages with the screw of the second wheel-cylinder assembly 4B so that the second rod 5B extends and retracts in the forward-rearward direction FR as the second wheel-cylinder assembly 4B rotates.

An end face of the second rod 5B is provided with a pivot $5B_1$ in a similar manner as the end face of the first rod 5A being provided with the first pivot $5A_1$ as shown in FIG. 2C. The second pivot $5B_1$ of the second rod 5B is inserted to a concave portion of the mirror holder H, and arranged to be rotatable in the concave portion. The second pivot $5B_1$ is positioned, for example, right to the rotation center P1 of the mirror M along the leftward-rightward direction LR. The second pivot $5B_1$ pushes the mirror holder H at the concave portion in the rearward direction RW when the second rod 5B extends out from the second wheel-cylinder assembly 4B as the second wheel-cylinder assembly 4B is rotated by the second worm wheel $3B_2$. The second pivot $5B_1$ pulls the mirror holder H at the concave portion in the forward direction FW when the second rod 5B retracts into the second wheel-cylinder assembly 4B as the second wheel-cylinder assembly 4B is rotated by the second worm wheel $3B_2$.

According to the embodiment of the present invention, the first rotational axis $X_1$ of the first motor $3A_1$ and the second rotational axis $X_2$ of the second motor $3B_1$ are parallel to each other. The first motor $3A_1$ and the second motor $3B_1$ are arranged to overlap each other substantially entirely in the arranging direction of the first motor $3A_1$, the second motor $3B_1$ and the mirror M. The arranging direction according to the embodiment of the present invention, for example, is in the forward-rearward direction FR. In a conventional vehicle mirror actuator 11 shown in FIGS. 3A and 3B, although a first rotational axis $Y_1$ of a first motor $13A_1$ and a second rotational axis $Y_2$ of a second motor $13B_1$ are parallel to each other, a first motor unit 13A and a second motor unit 13B are arranged side by side to each other in a direction substantially parallel to a mirror surface of the mirror M.

Therefore, according to the embodiment of the present invention, the vehicle mirror actuator 1 can be reduced in size in the direction substantially parallel to the mirror surface of the mirror M. Because, within the mirror housing MH, unused space is available more along the forward-rearward direction FR than along the direction substantially parallel to the mirror surface, the reduction of the vehicle mirror actuator 1 in size in the direction substantially parallel to the mirror surface can better utilize space within the mirror housing MH.

Further, according to the embodiment of the present invention shown in FIGS. 2A and 2C, an adjust span of the vehicle mirror actuator 1 in the vertical direction V is defined as L1, which is a distance between the rotation center P1 of the mirror M and a center of the first pivot $5A_1$ of the first rod 5A. An adjust span of the vehicle mirror actuator 1 in the leftward-rightward direction LR is defined as L2, which is a distance between the rotation center P1 of the mirror M and a center of the second pivot $5B_1$ of the second rod 5B. The adjust span L1 substantially equals to the adjust span L2. According to the embodiment of the present invention, the point P2 on the first rotational axis $X_1$ of the first motor $3A_1$, the point P3 on the second rotational axis $X_2$ of the second motor $3B_1$, and the rotation center P1 of the mirror M are aligned on the single straight line.

Figure 3A:
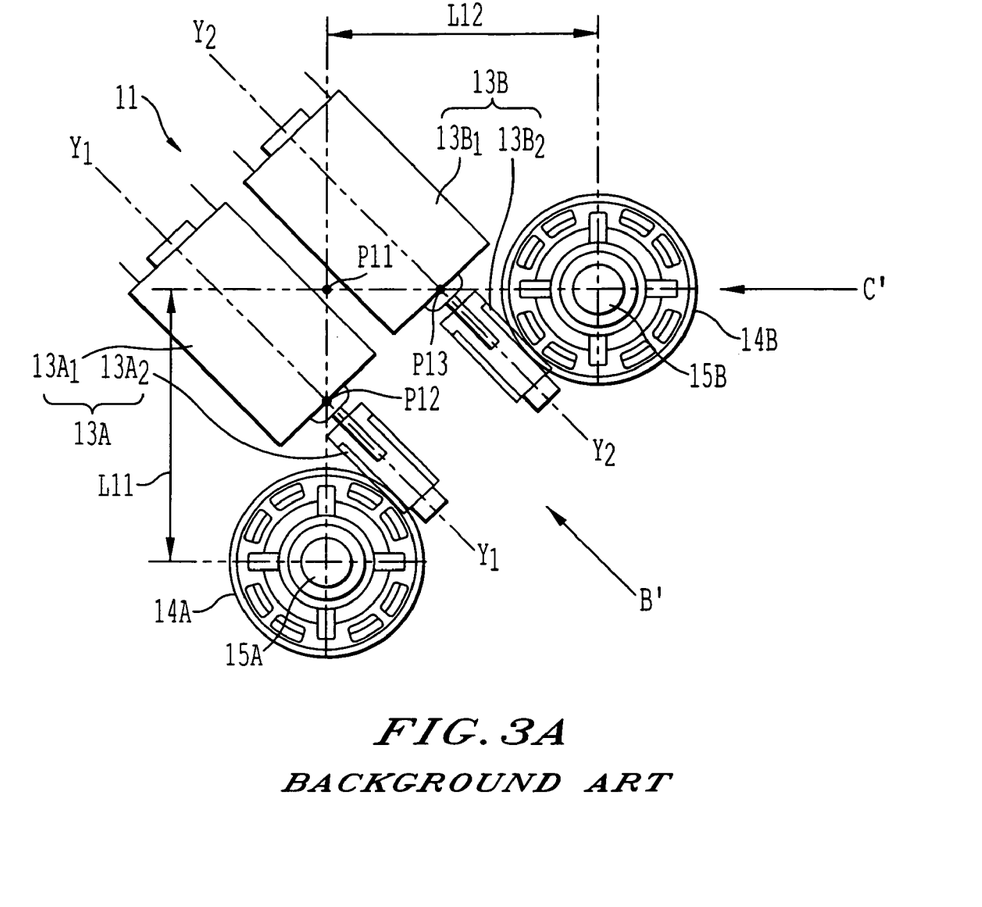
FIG. 3A is a plan view of a vehicle mirror actuator contained in an exterior rear view mirror of background art.
Figure 3B:
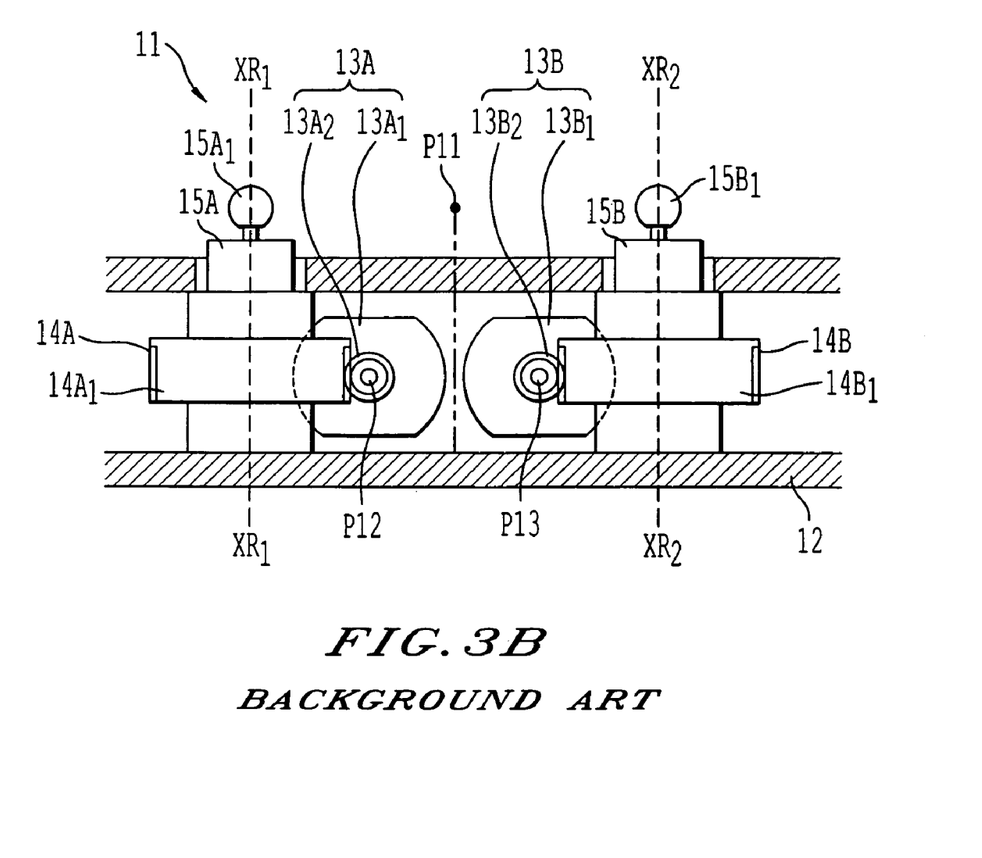
FIG. 3B is a side view of the vehicle mirror actuator shown in FIG. 3A.
Figure 3C:
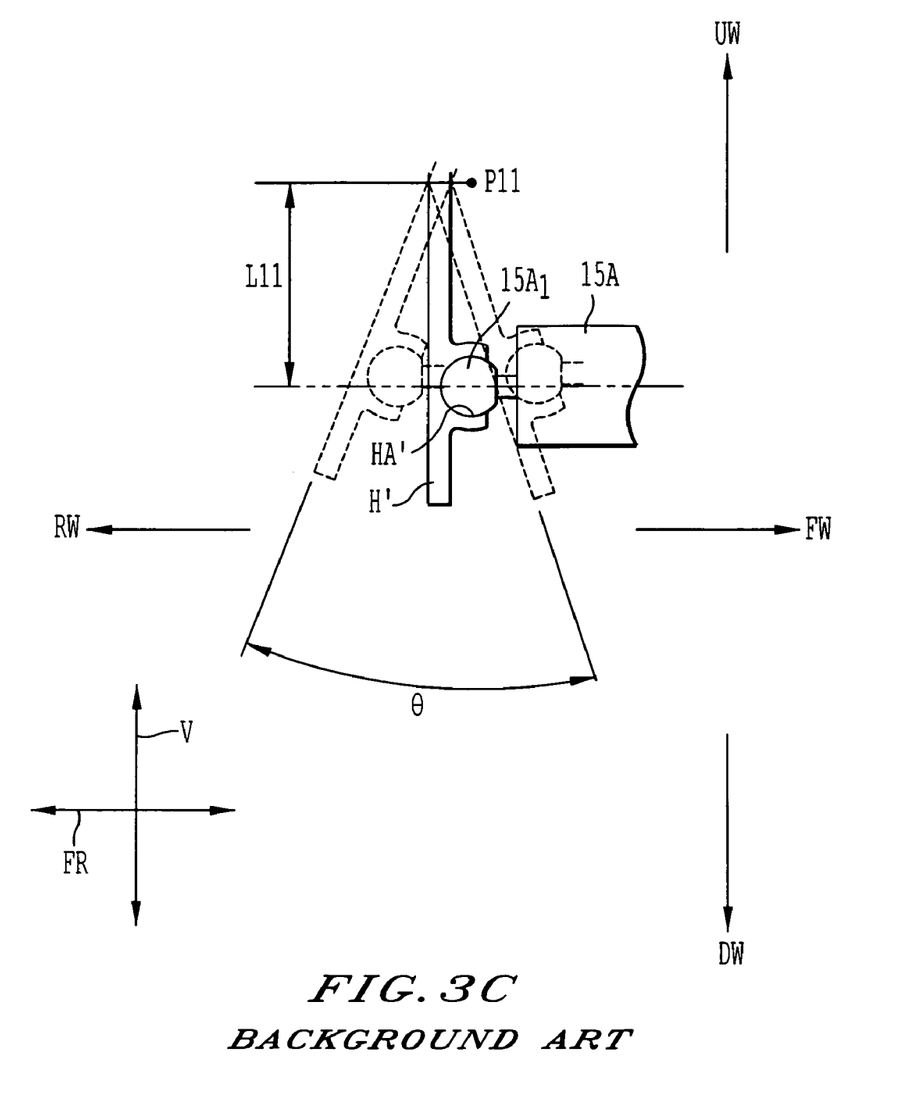
FIG. 3C is a side view of a mirror holder and a rod of the background art explaining an adjust span.

In the conventional vehicle mirror actuator 11 shown in FIGS. 3A, 3B which is a view in a direction of B' in FIGS. 3A, and 3C which is a view in a direction of C' in FIG. 3A, the first motor unit 13A and the second motor unit 13B are arranged side by side to each other in the direction substantially parallel to the mirror surface of the mirror M. Thus, a rotation center P11 of the conventional vehicle mirror actuator 11 is positioned between the first motor $13A_1$ and the second motor $13B_1$, and not aligned with neither a point P12 on the first rotational axis $Y_1$ of the first motor $13A_1$ nor a point P 13 on the second rotational axis $Y_2$ of the second motor $13B_1$ on a single straight line. Therefore, an adjust span L11 of the conventional vehicle mirror actuator 11, which is a distance between the rotation center P11 and a center of a first pivot $15A_1$ of a first rod 15A, is longer than the adjust span L1 of the vehicle mirror actuator 1 of the embodiment of the present invention. Similarly, an adjust span L12 of the conventional vehicle mirror actuator 11, which is a distance between the rotation center P11 and a center of a second pivot $15B_1$ of a second rod 15B, is longer than the adjust span L2 of the vehicle mirror actuator 1 of the embodiment of the present invention.

Consequently, referring to FIGS. 2C and 3C, when the mirror M is to be rotated to a desired angle θ in the first direction, a distance which the first pivot $5A_1$ of the vehicle mirror actuator 1 is required to travel is shorter than a distance which the pivot 15A of the conventional vehicle mirror actuator 11 is required to travel. Similarly, when the mirror M is to be rotated to a desired angle in the second direction, a distance which the second pivot $5B_1$ of the vehicle mirror actuator 1 is required to travel is shorter than a distance which the pivot $15B_1$ of the conventional vehicle mirror actuator 11 is required to travel. As a result, according to the embodiment of the present invention, a time period required to adjust the mirror M can be reduced. Also, electrical power which the motor $3A_1$ and the motor $3B_1$ are required to consume to rotate the mirror M can be reduced thereby making adjustment of the mirror M economical.

Moreover, according to the embodiment of the present invention, the vehicle mirror actuator 1 is to be used for the right side exterior rear view mirror OM. However, the vehicle mirror actuator 1 may be modified for a left side exterior rear view mirror by rotating 90 degrees in a clockwise direction around the arranging direction of the first motor $3A_1$, the second motor $3B_1$ and the mirror M. In addition, referring to FIG. 1, the mirror M and the mirror holder H may be manufactured as a single-molded unit. Shapes of the mirror housing MH and the flame 5B are not restricted to those depicted in FIG. 1. The vehicle mirror actuator 1 may be positioned in the mirror housing MH differently. Further, the first motor unit 3A and the second motor unit 3B may have a different configuration from each other, and may be arranged to overlap each other partially in the forward-rearward direction FR.

Obviously, numerous modifications and variations of the present invention are possible in light of the above teachings. It is therefore to be understood that within the scope of the appended claims, the invention may be practiced otherwise than as specifically described herein.

What is Claimed as New and Desired to be Secured by Letters Patent Of the United States is:

1. A vehicle mirror actuator comprising:
   an actuator housing;
   a second motor provided in the actuator housing and configured to adjust a mirror angle in a second direction of a mirror; and
   a first motor provided in the actuator housing between the second motor and the mirror and configured to adjust a mirror angle in a first direction of the mirrors,
   wherein the first motor and the second motor are arranged such that a point on a first rotational axis of the first motor, a point on a second rotational axis of the second motor, and a rotation center of the mirror are on a single straight line.

2. The vehicle mirror actuator according to claim 1, wherein the first motor and the second motor are arranged to overlap each other partially along an arranging direction of the first motor, the second motor and the mirror.

3. The vehicle mirror actuator according to claim 1, wherein the first motor and the second motor are arranged to overlap each other substantially entirely along an arranging direction of the first motor, the second motor and the mirror.

4. The vehicle mirror actuator according to claim 1, wherein the first direction is substantially perpendicular to the second direction.

5. An exterior mirror for a vehicle comprising:
   a mirror;
   an actuator housing;
   a second motor provided in the actuator housing and configured to adjust a mirror angle in a second direction of the mirror; and
   a first motor provided in the actuator housing between the second motor and the mirror and configured to adjust a mirror angle in a first direction of the mirror,
   wherein the first motor and the second motor are arranged such that a point on a first rotational axis of the first motor, a point on a second rotational axis of the second motor, and a rotation center of the mirror are on a single straight line.

6. The exterior mirror for a vehicle according to claim 5, wherein the first motor and the second motor are arranged to overlap each other partially along an arranging direction of the first motor, the second motor and the mirror.

7. The exterior mirror for a vehicle according to claim 5, wherein the first motor and the second motor are arranged to overlap each other substantially entirely along an arranging direction of the first motor, the second motor and the mirror.

8. The exterior mirror for a vehicle according to claim 5, wherein the first direction is substantially perpendicular to the second direction.

* * * * *